United States Patent
Loce et al.

(10) Patent No.: US 9,378,421 B2
(45) Date of Patent: Jun. 28, 2016

(54) SYSTEM AND METHOD FOR SEAT OCCUPANCY DETECTION FROM CEILING MOUNTED CAMERA USING ROBUST ADAPTIVE THRESHOLD CRITERIA

(71) Applicant: Xerox Corporation, Norwalk, CT (US)

(72) Inventors: Robert P. Loce, Webster, NY (US); Waqas Sultani, Orlando, FL (US); Hao Wu, Pittsford, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/673,943

(22) Filed: Mar. 31, 2015

(65) Prior Publication Data

US 2016/0092733 A1 Mar. 31, 2016

Related U.S. Application Data

(60) Provisional application No. 62/056,838, filed on Sep. 29, 2014.

(51) Int. Cl.
| | |
|---|---|
| G06K 9/00 | (2006.01) |
| G06K 9/32 | (2006.01) |
| G06K 9/46 | (2006.01) |
| G06K 9/62 | (2006.01) |

(52) U.S. Cl.
CPC ........ *G06K 9/00624* (2013.01); *G06K 9/00838* (2013.01); *G06K 9/3233* (2013.01); *G06K 9/4642* (2013.01); *G06K 9/4652* (2013.01); *G06K 9/6212* (2013.01); *G06K 9/6215* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,890,085 A * | 3/1999 | Corrado | ........... | B60N 2/002 180/271 |
| 6,116,640 A * | 9/2000 | Tanaka | ........... | G06K 9/00362 280/735 |
| 6,459,974 B1 * | 10/2002 | Baloch | ........... | G06K 9/00362 180/271 |
| 6,853,898 B2 * | 2/2005 | Farmer | ........... | B60R 21/01558 180/169 |
| 6,925,193 B2 * | 8/2005 | Farmer | ........... | G06K 9/00362 382/103 |
| 7,009,502 B2 * | 3/2006 | Breed | ........... | B60R 21/01516 280/735 |

(Continued)

OTHER PUBLICATIONS

Felzenszwalb et al., "Object Detection with Discriminatively Trained Part Based Models", Institute of Electrical and Electronics Engineers (IEEE) Transactions on Pattern Analysis and Machine Intelligence, vol. 32, No. 9 (Sep. 2010), pp. 1-20.

(Continued)

*Primary Examiner* — Alex Liew
(74) *Attorney, Agent, or Firm* — Fay Sharpe LLP

(57) ABSTRACT

A method for detecting sitting behavior includes acquiring a sequence of frames capturing a scene-of-interest at an overhead view. The method includes detecting at least one empty seat within the scene-of-interest and associating the seat as being unoccupied and the frame as a reference frame. The method includes extracting reference features describing a region of the unoccupied seat in the reference frame and quantifying the reference features to form a reference feature vector. The method includes extracting features describing the region in a given frame and quantifying the features to form a current feature vector. The method includes measuring a change in a feature vector over time using the reference feature vector and the current feature vector. The method includes and determining a status of the seat in the given frame as being one of occupied and unoccupied based on the change in the feature vector.

19 Claims, 14 Drawing Sheets

(56) References Cited

U.S. PATENT DOCUMENTS

| | | | | |
|---|---|---|---|---|
| 7,058,223 B2* | 6/2006 | Cox | G06F 17/3002 | |
| | | | 382/190 | |
| 7,197,180 B2* | 3/2007 | Farmer | B60R 16/0231 | |
| | | | 382/160 | |
| 7,471,832 B2* | 12/2008 | Luo | G06K 9/00362 | |
| | | | 280/735 | |
| 7,623,950 B2* | 11/2009 | Kong | B60R 21/01538 | |
| | | | 701/45 | |
| 2002/0059022 A1* | 5/2002 | Breed | G06K 9/00362 | |
| | | | 701/45 | |
| 2002/0169532 A1* | 11/2002 | Zhang | B60R 21/01538 | |
| | | | 701/45 | |
| 2003/0209893 A1* | 11/2003 | Breed | B60J 10/00 | |
| | | | 280/735 | |
| 2005/0031166 A1* | 2/2005 | Fujimura | G06K 9/00369 | |
| | | | 382/103 | |
| 2006/0208169 A1* | 9/2006 | Breed | B60N 2/002 | |
| | | | 250/221 | |
| 2006/0251293 A1* | 11/2006 | Piirainen | B60N 2/002 | |
| | | | 382/104 | |
| 2007/0041667 A1* | 2/2007 | Cox | G06F 17/30017 | |
| | | | 382/305 | |
| 2007/0086624 A1* | 4/2007 | Breed | G06K 9/00362 | |
| | | | 382/104 | |
| 2007/0127811 A1* | 6/2007 | Luo | G06K 9/00369 | |
| | | | 382/159 | |
| 2008/0292146 A1* | 11/2008 | Breed | B60N 2/002 | |
| | | | 382/118 | |
| 2009/0175518 A1* | 7/2009 | Ikuma | A61B 5/06 | |
| | | | 382/128 | |

OTHER PUBLICATIONS

Van De Weijer et al., "Learning Color Names for Real-World Applications", IEEE Transactions on Image Processing, Inst. of Electrical and Electronics Engineers (IEEE), vol. 18, No. 7, 1512-13 (2009), 25 pgs.

Zhao et al., "Dynamic texture recognition using local binary patterns with an application to facial expressions", IEEE Transactions on Pattern Analysis and Machine Intelligence, vol. 29, No. 6, Jun. 2007, 14 pgs.

\* cited by examiner

SYSTEM AND METHOD FOR SEAT OCCUPANCY DETECTION FROM CEILING MOUNTED CAMERA USING ROBUST ADAPTIVE THRESHOLD CRITERIA

This is application claims priority to U.S. Provisional Application Ser. No. 62/056,838, filed Sep. 29, 2014, entitled "System and Method for Detecting Settle-Down Time in a Space Using Robust Sitting Behavior Detection From Side-View Video Data and Seat Occupancy Information From Ceiling-Mounted Video-Data", by Robert P. Loce, et al., the disclosure of which is hereby incorporated by reference in its entirety.

BACKGROUND

The present disclosure relates to a system and method for determining seat occupancy in a select space by detecting and/or recognizing sitting behavior. The disclosure can find application, for example, in a classroom setting; however, the teachings made herein are amenable to other like applications and settings.

A measurement of settle-down time in any environment requiring persons be seated, such as a classroom or an airplane, etc., is one important metric in determining the efficiency of any activity that requires the person(s) be seated to proceed. For instance, seat occupancy information and patterns, measured for any indoor environment, such as, airplanes, cinemas, offices, meeting rooms and houses, or outdoor environment, such as a stadium, can be useful in optimizing the performance of various venues. This information is also useful for other purposes, such as identifying remaining occupants in evacuations.

One method for detecting seat occupancy in a vehicle uses capacitive sensor technology. However this approach requires that well-designed hardware sensors be installed in the seats. The high cost of sensors and human labor makes the sensor-based approach expensive and difficult to implement, and potentially ineffective in an indoor classroom or office environment.

A method for detecting occupancy is desired which requires no expensive training and hardware sensors.

INCORPORATION BY REFERENCE

The disclosure of co-pending and commonly assigned U.S. application Ser. No. 14/673,990, entitled "SYSTEM AND METHOD FOR DETECTING SETTLE DOWN TIME USING COMPUTER VISION TECHNIQUES", filed Date, 2015, by Waqas Sultani, et al., the content of which is totally incorporated herein by reference.

"Object Detection with Discriminatively Trained Part Based Models", by Pedro F. Felzenszwalb, Ross B. Girschick, David McAllester and Deva Ramanan, in Institute of Electrical and Electronics Engineers (IEEE) Transactions on Pattern Analysis and Machine Intelligence, VOL. 32, No. 9 (September 2010), the content of which is totally incorporated herein by reference.

"Learning Color Names for Real-World Applications" by Joost van de Weijer, Cordelia Schmid, Jakob Verbeek, and Diane Larlus, in IEEE Transactions on Image Processing, VOL. 18, No. 7, pp. 1512-13 (2009).

"Dynamic texture recognition using local binary patterns with an application to facial expressions", by Guoying Zhao and Matti Pietikainen, in IEEE Transactions on Pattern Analysis and Machine Intelligence, VOL. 29, No. 6, June 2007, the content of which is totally incorporated herein by reference.

BRIEF DESCRIPTION

Figure 1:
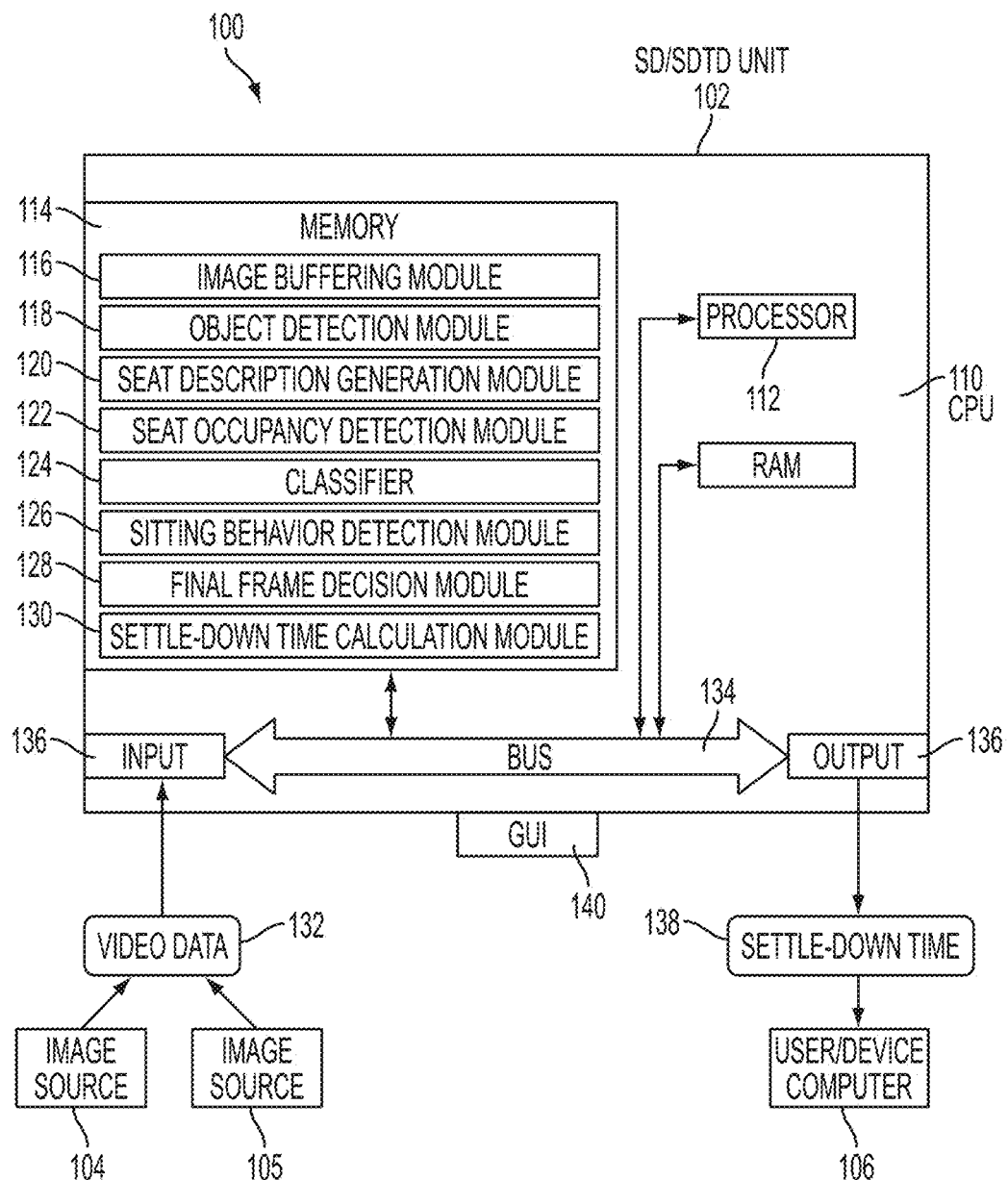
FIG. 1 is a schematic illustration of a vision-based system for computing settle-down time using occupancy detection.

One embodiment of the present disclosure relates a method for detecting sitting behavior. The method includes acquiring a sequence of frames capturing a scene-of-interest at an overhead view. The method includes detecting at least one empty seat within the scene-of-interest and associating the seat as being unoccupied and the frame as a reference frame. The method includes extracting reference features describing a region of the unoccupied seat in the reference frame and quantifying the reference features to form a reference feature vector. The method includes extracting features describing the region in a given frame and quantifying the features to form a current feature vector. The method includes measuring a change in a feature vector over time using the reference feature vector and the current feature vector. The method includes and determining a status of the seat in the given frame as being one of occupied and unoccupied based on the change in the feature vector.

Another embodiment of the present disclosure relates to a system for detecting sitting behavior. The system includes a sitting detection determination unit including a memory and a processor in communication with the processor. The processor is configured to acquire a sequence of frames capturing a scene-of-interest at an overhead view. The processor is further configured to detect at least one empty seat within the scene-of-interest and associating the seat as being unoccupied and the frame as a reference frame. The processor is further configured to extract reference features describing a region of the unoccupied seat in the reference frame and quantifying the reference features to form a reference feature vector. The processor is further configured to extract features describing the region in a given frame and quantifying the features to form a current feature vector. The processor is further configured to measure a change in a feature vector over time using the reference feature vector and the current feature vector. The processor is configured to determine a status of the seat in the given frame as being one of occupied and unoccupied based on the change in the feature vector.

DETAILED DESCRIPTION

The present disclosure relates to a system and method for determining seat occupancy in a select space by detecting and/or recognizing sitting behavior. The terms "sitting behavior", "sitting activity", and "sitting action" as used herein include characteristic standing-to-sitting movement patterns and positions of a human around and on a seat.

The term "settle-down time" as used herein refers to the time it takes at least one person or animal entering or standing in a room to be seated as determined from a reference time to the time of being seated.

An overview of a system and method for detecting settle-down time using computer vision techniques is disclosed. As part of this process, the system first detects when a seat-of-interest first becomes occupied in a selected space. In other words, the system determines the occupancy status of seats in the space. Mainly, the system surveys the space from one or more camera angles. The system first detects the location of unoccupied seats within the space for a given frame. Then in one embodiment, the system searches for changes in the appearance of a seat, particularly from an overhead camera angle in the contemplated embodiment. The system performs this search by extracting image/appearance metrics/features from each unoccupied seat, and generates a vector from the features. In contemplated embodiments, the system can generate one vector per seat or a long vector including the metrics/features of all seats in the space. The system analyzes subsequent frames for significant changes in the one or more feature vector. The system maps a trajectory reflecting the vector difference over time between a vector corresponding with the current frame and the vector corresponding with the unoccupied seat. When the difference is large enough—that is, it meets and exceeds a predetermined threshold—the system concludes that the seat is occupied. The system tracks the number of seats occupied in the space. When activity in the space indicates that the seats-of-interest are occupied, the system computes the time it took for the person(s) entering the room to settle down into the seats.

In one contemplated embodiment, the system can perform the search in response to a trigger indicating potential seat occupancy at a candidate frame. In other words, the system performs the search at the candidate frame, and neighboring frames, in response to recognizing behavior around the seat location in the candidate frame. The system analyzes frames from a camera angle different from the overhead view, such as an oblique angle generally viewing a side of the seats. For a given frame, the system determines a region of interest (ROI) around the seats where sitting behavior is expected. The system generates an activity feature vector using features it extracts from the ROI. The system applies the feature vector to a previously trained classifier, which compares the activity feature vector to a set of reference vectors that represent different types of sitting behaviors. The system maps scores—associating a degree the activity vector matches the reference vectors—over the sequence of frames. The system identifies the time corresponding with the highest/maximum score on the map. The system identifies the frame corresponding with that time, and associates that frame as a candidate frame including sitting behavior.

FIG. 1 is a schematic illustration of a vision-based system 100 for computing settle-down time. More particularly, the disclosure computes the settle-down time in response to detected sitting behavior using image and behavior recognition. The system 100 includes a sitting detection and/or settle-down time determination unit (hereinafter "SD/SDTD Unit 102") and at one image source 104, 105 linked together by communication links, referred to herein as a network. In one embodiment, the system 100 may be in further communication with a user device 106. These components are described in greater detail below.

The SD/SDTD unit 102 illustrated in FIG. 1 includes a controller 110 that is part of or associated with the unit 102. The exemplary controller 110 is adapted for controlling an analysis of video data received by the system 100. The controller 110 includes a processor 112, which controls the overall operation of the unit 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the device 102, executes instructions stored in memory 114 for performing the parts of the method outlined in the FIGS. 2 and 7. In some embodiments, the processor 112 and memory 114 may be combined in a single chip.

The device 102 may be embodied in a networked device, such as the image source(s) 104, 105, although it is also contemplated that the SD/SDTD unit 102 may be located elsewhere on a network to which the system 100 is connected, such as on a central server, a networked computer, or the like, or distributed throughout the network or otherwise accessible thereto. In other words, the processing can be performed within the image capture device 104, 105 on site or in a central processing offline or server computer after transferring the evidentiary images through a network. In one embodiment, the image source 104, 105 can be a device adapted to capture, relay and/or transmit the video and/or image data 130 to the SD/SDTD unit 102. In another embodiment, the video data 130 may be input from any suitable source, such as a workstation, a database, a memory storage device, such as a disk, or the like. The image source 104, 105 is in communication with the controller 110 containing the processor 112 and memories 114.

The sitting detection and the settle-down time determination stages disclosed herein are performed by the processor 112 according to the instructions contained in the memory 114. In particular, the memory 114 stores an image buffering module 116, which receives video data from at least one of the image sources 104, 105; an object detection module 118, which obtains from the video data a region of interest including seats (including chairs)—or a location of the seats—in a space being monitored; a seat description generation module 120, which extracts image/appearance metrics/features of each seat from a first sequence of frames acquired from the first image source 104, and generates a feature distribution or vector describing the seat; a seat occupancy detection module 122, which analyzes the second sequence to monitor a change in the feature distribution, and detects that a seat is occupied when a trajectory representing the change meets and exceeds a predetermined threshold; a classifier 124, which stores activity features/vectors of different samples of sitting behaviors observed in a training dataset; a sitting behavior detection module 126, which extracts activity features for each seat detected in a first sequence of frames acquired from the first image source 104, applies the features to the classifier to obtain a score map indicating a confidence level of sitting behavior observed in the second sequence, and determines a candidate frame number corresponding with sitting behavior recognition around a seat using a global max of the score map; a final frame decision module 128, which compares the output from modules 122 and 126 to select a final frame corresponding to when the seat is first occupied; and a settle-down time calculation module 130, which computes the duration it takes for seats to reach occupied status in the monitored space. Embodiments are contemplated wherein these instructions can be stored in a single module or as multiple modules embodied in different devices. The modules 116-130 will be later described with reference to the exemplary method.

The software modules as used herein, are intended to encompass any collection or set of instructions executable by the SD/SDTD unit 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the device 102 may be all connected by a bus 134.

With continued reference to FIG. 1, the SD/SDTD unit 102 also includes one or more communication interfaces 136, such as network interfaces, for communicating with external devices. The communication interfaces 136 may include, for example, a modem, a router, a cable, and and/or Ethernet port, etc. The communication interfaces 136 are adapted to receive the images ("video data 132") as input.

The SD/SDTD unit 102 may include one or more special purpose or general purpose computing devices, such as a server computer, controller, or any other computing device capable of executing instructions for performing the exemplary method.

FIG. 1 further illustrates the device 102 connected to the image source(s) 104, 105 for acquiring and/or providing the video (or image frame) data in electronic format. The image source(s) 104, 105 (hereinafter "video camera(s) 104, 105) may include one or more surveillance cameras that capture video from the scene of interest. The number of cameras may vary depending on the location of the area being monitored.

It is contemplated that the first image source 104 can include, for example, at least one fisheye camera having some spectral capability, such as common RGB sensing. The first image source 104 can acquire video data of the scene from an overhead/top-view perspective. The second image source 105 can include at least one RGB or monochromatic camera, which acquires video data of the scene from a side perspective. With continued reference to FIG. 1, the video data 130 undergoes processing by the SD/SDTD unit 102 to output seat occupancy information and/or settle-down time 138.

Furthermore, the system 100 can display the seat occupancy information and/or output in a suitable form on a graphic user interface (GUI) 140. The GUI 140 can include a display for displaying the information, to users, and a user input device, such as a keyboard or touch or writable screen, for receiving instructions as input, and/or a cursor control device, such as a mouse, touchpad, trackball, or the like, for communicating user input information and command selections to the processor 112. Alternatively, the SD/SDTD unit 102 can provide the seat occupancy information to the output device 106, which can display said information to a user.

Figure 2:
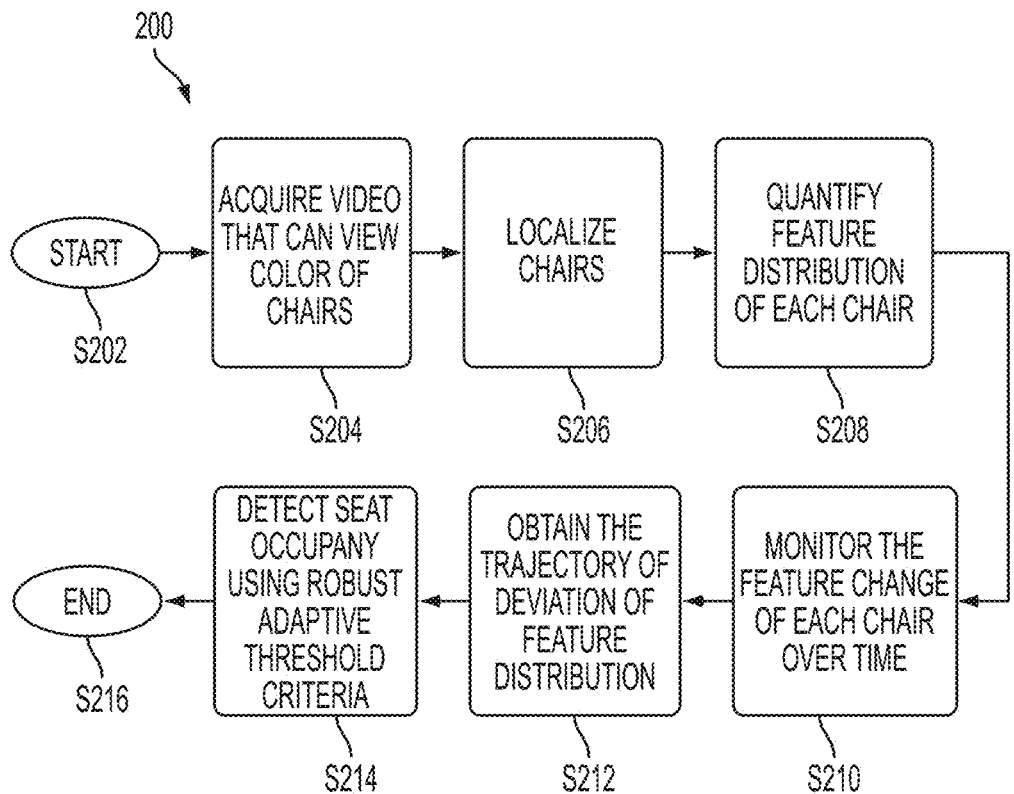
FIG. 2 is a flowchart showing a method for detecting occupancy in a previously unoccupied seat.

FIG. 2 is a flowchart showing a method 200 for detecting occupancy in a previously unoccupied seat. The method starts at S202. At step S204, the image buffering module 116 acquires successive frames capturing the scene of interest. In the contemplated embodiment, this video is acquired from the camera 104 positioned to capture the scene from an unobstructed overhead/top-view. Furthermore, the camera 104 can be stationary where the scene includes a closed space, such as a room, or the seats aren't expected to move. The desired overhead view can enable a clear viewing of one or more seats when the space is empty and when the seats are occupied.

As part of a preprocessing operation performed on a reference frame acquired from the overhead view video data when the space is empty and/or the seats are unoccupied, the object detection module 118 detects a ROI and/or location of a seat(s) where sitting behavior can be expected at S206. Mainly, any known object-detection method can be used to localize and/or define the seat(s), such as the deformable part model approach taught in "Object Detection with Discriminatively Trained Part Based Models", by Pedro F. Felzenszwalb, Ross B. Girschick, David McAllester and Deva Ramanan, in PAMI, 2010; the color-based approach taught in "Learning Color Names for Real-World Applications" by Joost van de Weijer, Cordelia Schmid, Jakob Verbeek, and Diane Larlus, in TIP, 2009; the texture-based approach taught in "Dynamic texture recognition using local binary patterns with an application to facial expressions", by Guoying Zhao and Matti Pietikainen, in PAMI, 2007, all incorporated by reference herein. Other example approaches include seat detection, segmentation, and/or manual annotation in an empty space.

Figure 3A:
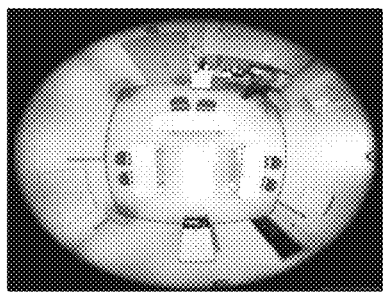
FIG. 3A shows an example image frame of a room from a fish eye camera.
Figure 3B:
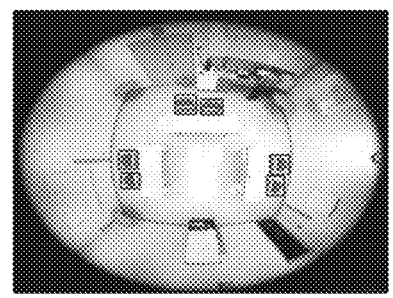
FIG. 3B shows a corresponding localization of the chairs in the example image frame of FIG. 3A.

In the contemplated embodiment, the seat(s) are detected in a given reference frame including an empty space—i.e., where all surveyed seats are unoccupied and there is no occlusion. In embodiments where the tables and chair layouts are fixed, such as a classroom or airplane setting, etc., a manual annotation of the seats can be received. FIG. 3A shows an example image frame from a fish eye camera, and FIG. 3B shows a corresponding localization of the chairs in the example image frame. Generally, the seats can be manually or automatically specified by detecting the general shape, color, or other characteristics of the seat.

Once a location of the seat(s) is specified, the seat description generation module 120 extracts features describing the seat and quantifies the features at S208. In one example embodiment, the module 120 can measure the color distribution (using RGB or any other color space or using color names) of the seat(s); however, there is no limitation made herein to the feature being measured. Histograms computed using RGB or LAB color space or other color or spectral attributes are contemplated, such as those specified in "Learning Color Names for Real-World Applications" mentioned supra. In the illustrative embodiment, the module 120 can compute a three-dimensional color histogram from RGB values measured for each seat, and then it can generate a vector using the histogram. This process is repeated for each frame analyzed in a future sequence. However, the original feature distribution is used as a reference in the processing performed on the sequence of (new/subsequent) frames acquired by the buffering module 116. Furthermore, other than using color distribution for the measurement, embodiments are contemplated that extract texture/structure features (such as energy, contrast, entropy features calculated from gray-level or color level co-occurrence matrix). Further examples which can be used to locate and/or describe a seat can include image patch description features (such as SIFT, MSER, etc.), or a combination of the above.

Returning to FIG. 2, the seat occupancy detection module 126 monitors a change in the feature distribution for the seat(s) over time at S210. The change can be computed using any known distance measure, such as, for example, histogram intersection, ki-square distance or Kullback-Leibler (KL) divergence. In one embodiment using KL divergence to monitor the change, the module 126 computes the following equation:

$$D(P \| Q) = \sum_i \ln\left(\frac{P(i)}{Q(i)}\right) P(i), \quad (1)$$

where Q is a reference histogram computed for the seat; and, P is a histogram computed for a given frame in the new sequence.

Figure 4A:
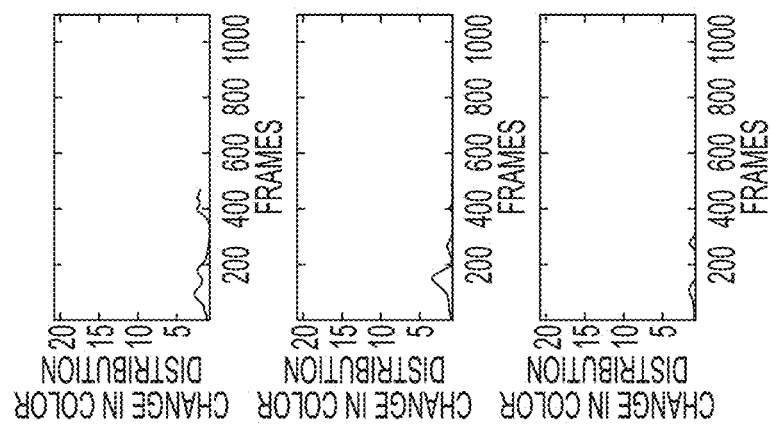
FIG. 4A is an example image frame showing people entering the room.
Figure 4A:
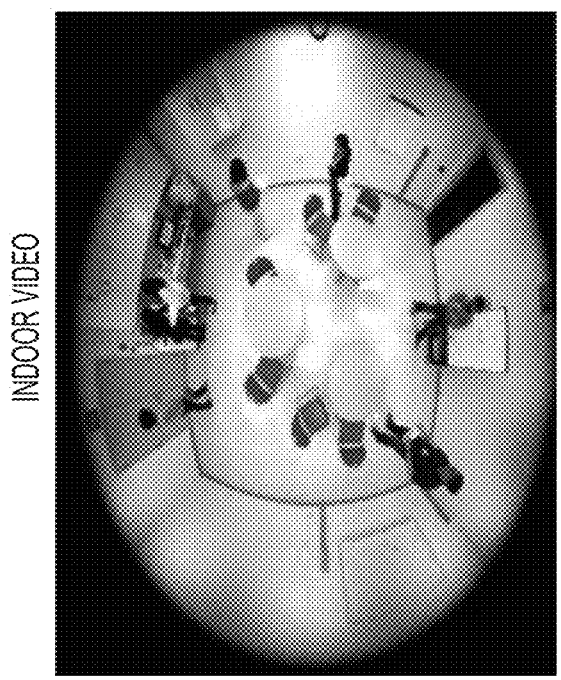
Figure 4B:
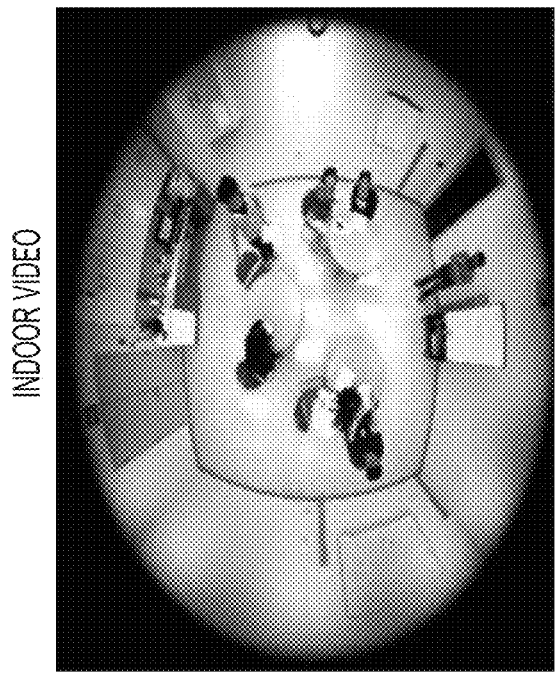
FIG. 4B is an example image frame showing people approaching and/or starting to seat in the chairs.
Figure 4B:
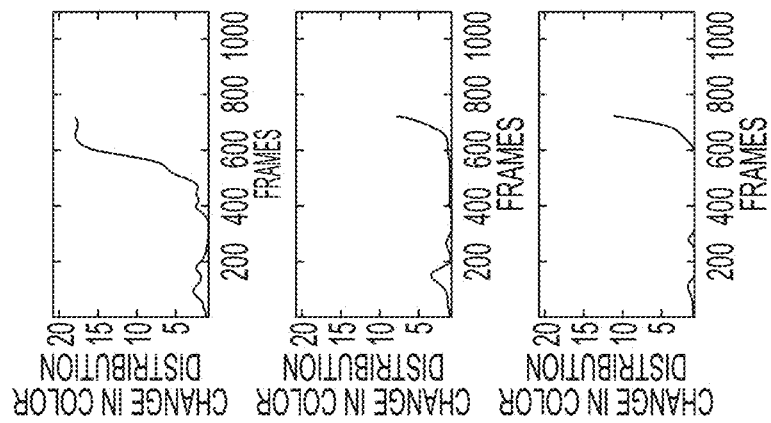
Figure 4C:
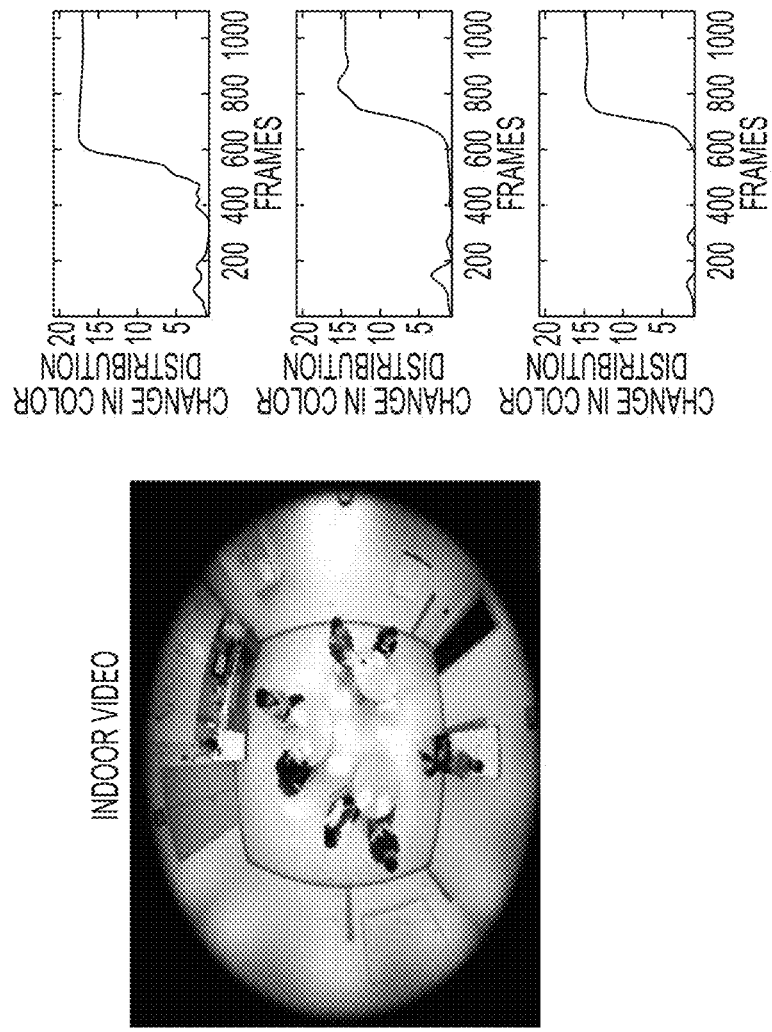
FIG. 4C is an example image frame later showing a person sitting on each chair.

With every new or successive frame of video, the module 120 measures the distance/deviation between feature distributions of the new frame and the reference frame at a seat(s) location using the same approach used to measure the reference features. FIGS. 4A-C show three example frames in a sequence and corresponding graphs each plotting the change in the feature distribution for a chairs in a scene. In the illustrative graphs, the change in seat color is plotted across the frames (or time). FIG. 4A is an example image frame showing people entering the space (room). The plot is generally level and shows no substantial climbs, dips, or spikes, thus representing an original steady state. FIG. 4B is an example image frame, later in the video sequence, showing the people approaching and/or starting to sit in the seats. The graphs for these chairs each curve upward over time, each indicating an increase in changes in the feature (e.g., color) distribution. FIG. 4C is an example image frame later in the sequence showing a person sitting on each chair. The graphs for these chairs level off to represent a steady state, i.e., no further significant changes in the feature distribution.

Figure 5A:
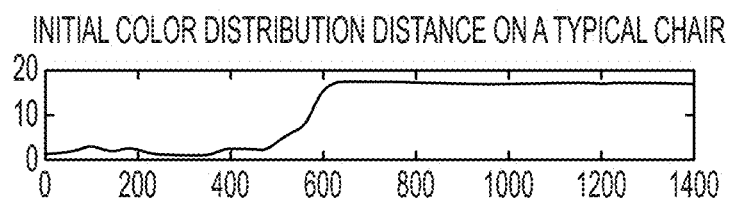
FIG. 5A is an example graph showing changes in the initial vectors for a seat over time/across frames.

FIG. 5A is another example graph showing changes in the initial vectors for a seat over time/across frames. As viewable in the figure, change in color distribution follows a specific pattern over time. When a person sits on seat, the feature distribution of the seat can change by large amount. To detect seat occupancy, system detects the regions in the trajectory where the slope increases by a predetermined amount and then becomes level or constant. This point in the trajectory is treated as a potential candidate frame including a seat being occupied. If there is no subsequent decline/dip in the trajectory, the candidate frame is selected as the final frame. If there is a subsequent decline/dip, then the system searches for the next region of the trajectory that may represent seat occupancy.

However, the threshold approach may generate faulty results when changes in illumination, shadows, and occlusion affect the image. To reduce this risk, the module 122 can compute a trajectory of deviation for the feature distribution, and apply the trajectory to a predetermined threshold at S212.

Figure 10A:
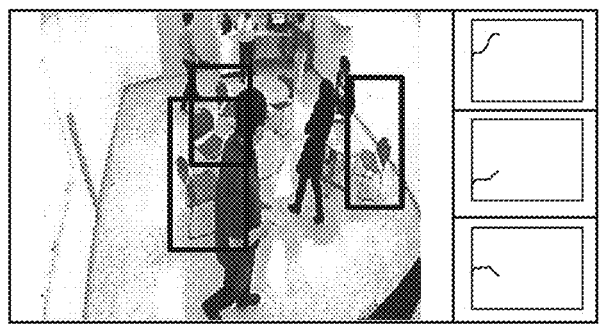
FIG. 10A shows and example frame acquired from a side-viewing angle and capturing people moving around the monitored space.

In order to make the threshold criteria adaptive and robust to noise, the module 122 can smooth the graph and find the average/smoothed derivatives of the graph in non-overlapping small windows over time using the following equation:

$$D1(t0) = \frac{\sum_{t=t_0}^{t_0+T} Traj(t+1) - Traj(t)}{T+1} = \frac{Traj(t0+T) - Traj(t0)}{T+1} \quad (2)$$

where Traj is the signal value in the graph as shown in FIG. 10A; and, $D_1(t)$ is the out smoothed derivative of the trajectory.

The smoothing is accomplished by summing the trajectory differences of T time intervals. For the illustrative graph, the interval T value is, for example, 49.

Figure 5B:
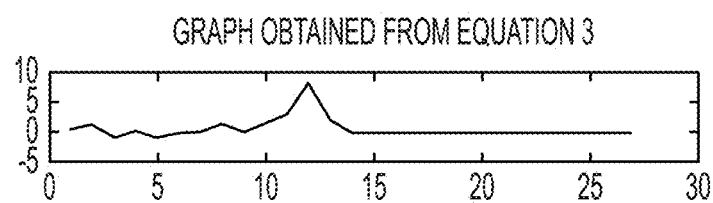
FIG. 5B is a graph representing the smoothed derivative of the changes in FIG. 5A.

FIG. 5B is a graph representing the smoothed derivative of the changes in FIG. 5A, which plots the new signal $D_1(t)$ computed using Eq. (2).

Figure 10B:
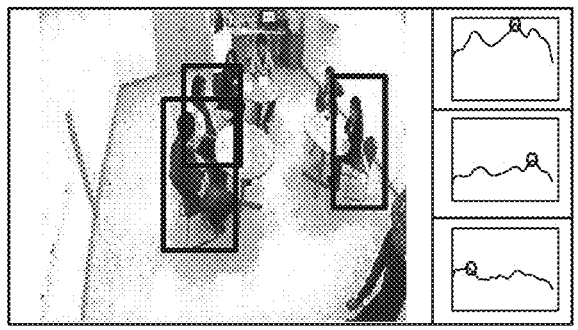
FIG. 10B shows an example frame acquired from a side-viewing angle and capturing the people sitting on the three detected seats later in the video sequence.

The module 122 can then compute a second derivative of the trajectory/smoothed out graph to determine a global minima using the following equation:

$$D2(t0) = \frac{\sum_{t=t_0}^{t_0+T} D_1(t+1) - D_1(t)}{T+1} = \frac{D_1(t0+T) - D_1(t)}{T+1} \quad (3)$$

where $D_1(t)$ is the signal value in the graph as shown in FIG. 10B; and, $D_2(t)$ is the second derivative of the trajectory.

The smoothing is accomplished by summing the trajectory differences of T time intervals.

Figure 5C:
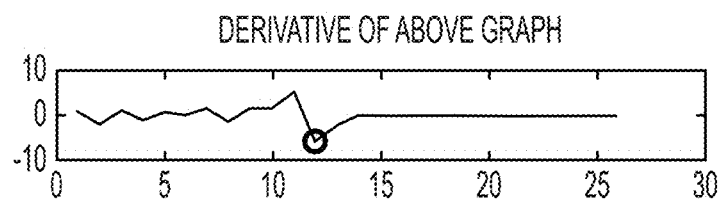
FIG. 5C is a graph representing the second derivative of the trajectory $D_{t2}$ shown in FIG. 5B.

FIG. 5C is a graph representing the second derivative of the trajectory $D_{t2}$ shown in FIG. 5B, which plots the new signal $D_{t1}$ computed using Eq. (2). The module 122 identifies the global minima (see in FIG. 10C) in the graph representing the second trajectory. The module 122 associates the global minima in the graph representing the plot of the second derivative as a candidate frame, meaning the seat being analyzed may have an occupied status at that frame.

Returning to FIG. 2, the module 122 detects whether the seat being analyzed is occupied at S214 by applying the trajectory or a smoothed out derivative of the trajectory to a predetermined threshold. A technical effect of this approach is that the system does not require exhaustive parameter tuning as the robust adaptive threshold criteria detects seat occupancy automatically and independently.

Figure 6A:
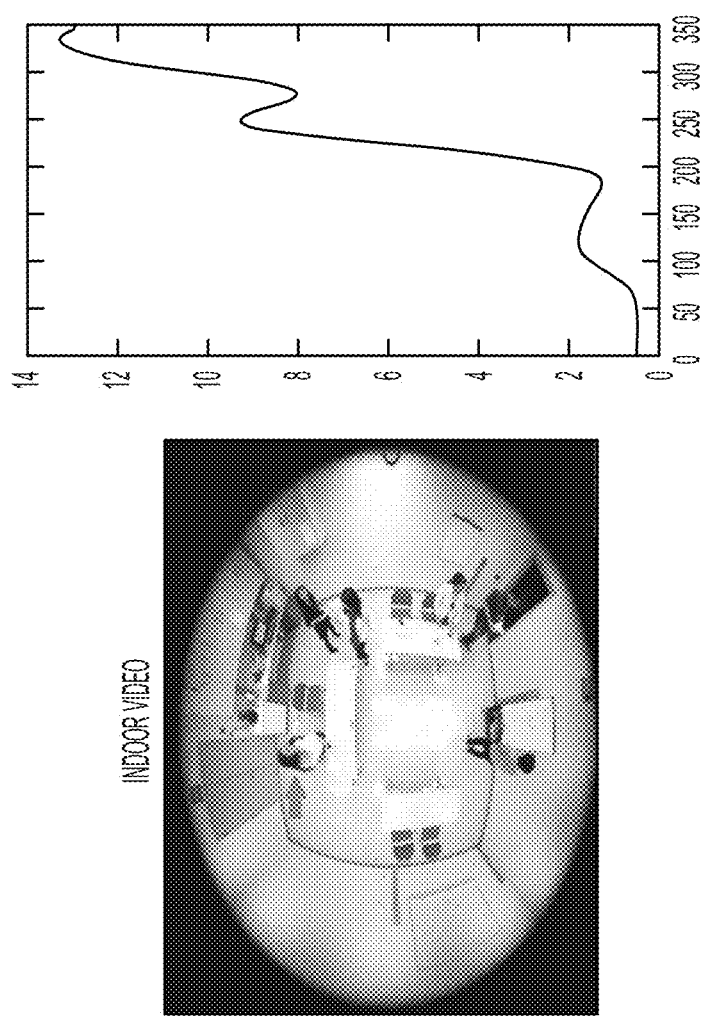
FIG. 6A shows a frame capturing a person standing by a chair in first frame.
Figure 6B:
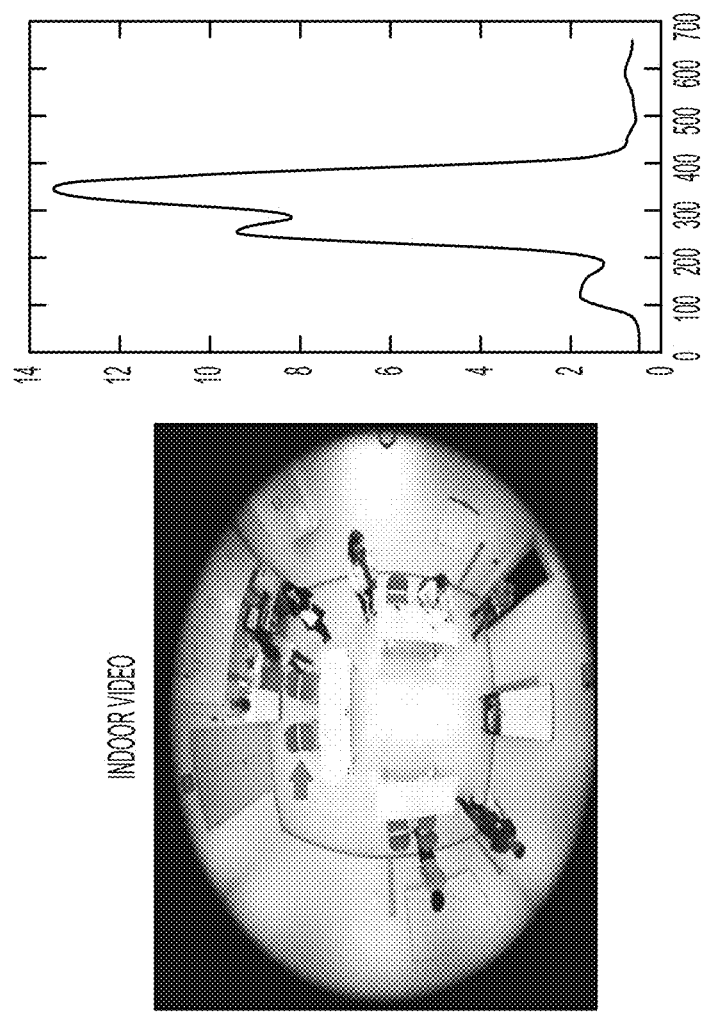
FIG. 6B shows a frame capturing the person in FIG. 6A having left the chair in a later frame.

While the threshold criteria disclosed supra is adaptive and robust to small fluctuations in the feature distribution, it may result in false detections where a person stands by a chair for a few minutes and then leaves. The example images in FIGS. 6A and 6B illustrate this situation, where a person is observed standing by a chair in first frame (FIG. 6A) in time, but the person is observed as having left the chair in a second frame (FIG. 6B). In contemplated embodiments, the system can count a predetermined number N (for example, 100) of frames after it detects a seat as having an occupied status. The module 122 can observe the feature distribution at the Nth frame. If the difference between the feature distribution of the candidate frame and the Nth subsequent frame decreases in a value greater than a predetermined threshold, the module 122 associates the candidate frame as belonging to a false detection. In response to the false detection, the module 122 searches the plot for the next increase (without a subsequent drop) and repeats the thresholding operation until the feature distribution of the candidate frame and the Nth subsequent frame does not decrease in value. The method ends at S216.

The result—whether it be an occupancy status for a seat-of-interest or a frame number corresponding to an occupied status—output by method 200 can be treated as the final information used for further processing the settle-down time, or it can be treated as complementary information for detecting sitting behavior at the seat-of-interest, thus inferring that the seat is occupied.

Figure 7:
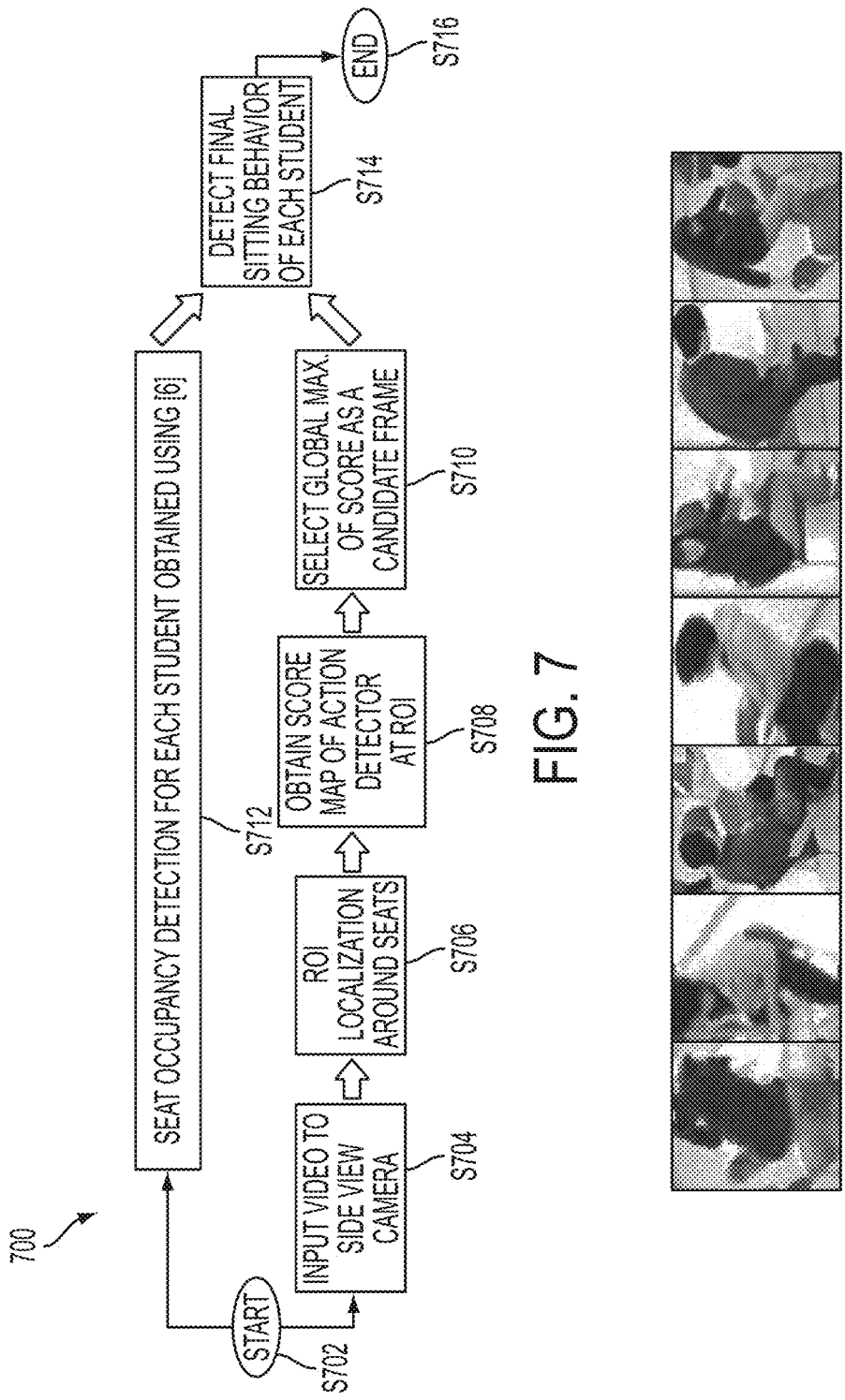
FIG. 7 shows a method for detecting sitting behavior in a previously unoccupied seat.

FIG. 7 shows a method 700 for detecting sitting behavior in a previously unoccupied seat. The method starts at S702. At S704, the sitting behavior detection module 126, or any module, trains a classifier 124 to recognize sitting behavior using a set of positive and negative samples acquired from the camera 105 for preprocessing operations performed offline. The module 126 acquires the samples from test video, which captures the scene of interest from the at least one camera 105 that is later used online. In the instance that more than one camera 105 is used, embodiments contemplate that the cameras 105 are of the same type and capture video at generally the same perspective. Any known method for training a classifier can be performed, such as, for example, those disclosed in the publications "Action Recognition from One Example", by Hae Jong Seo and Peyman Milanfar, in IEEE Transactions on Pattern Analysis and Machine Intelligence, Vol. 22, No. 5, May 2011; "Spatiotemporal Deformable Part Models for Action Detection", by Yicong Tian, Ragul Sukthankar and Mubarak Shah, in CVPR, 2013; and, "Discriminative Figure-Centric Models for Joint Action Localization and Recognition", by Tian Lan, Yang Wang and Greg Mori, in ICCV, 2011, the contents of which is fully incorporated herein.

Figure 8:
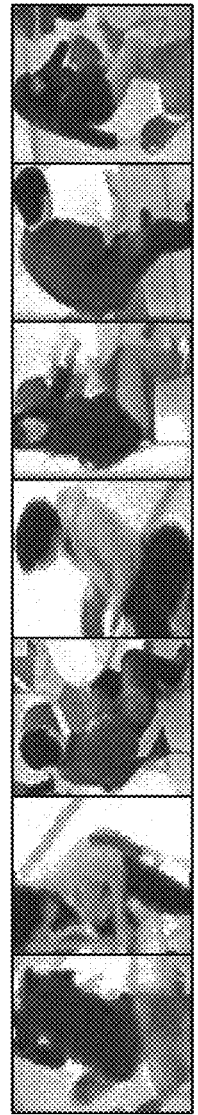
FIG. 8 shows an example dataset including cropped samples of different sitting behaviors captured around previously identified seat locations.

An example dataset is shown in FIG. 8 including cropped samples of different sitting behaviors captured around previously identified seat locations. Using the samples, the module can extract activity features, such as space-time Local Steering Kernels (3-D LSKs). One technique for generating local steering kernels as a three-dimensional feature is provided in "Action Recognition from One Example", mentioned supra; however, embodiments are contemplated which extract and use other types of activity features. Other action/activity features used in literatures can be adopted here too, such as Histogram of Oriented Gradients (HOG/3D HOG), or Optical Flow (HOF), Space-Time Interest Points (STIP), and two-dimensional image features along motion trajectories, etc.

The features capture the local space-time information around key-points. The space-time local steering kernel is defined as follows:

$$K(p_s - p) = \frac{\sqrt{\det(C_s)}}{h^2} \exp\left\{\frac{(p_s - p)^T C_s((p_s - p))}{-2h^2}\right\}, \quad (4)$$

where p=[x,y,t] is a neighboring pixel around p;
h is a global smoothing parameter; and,
matrix $C_s$ is a covariance matrix computed from a collection of first derivatives along spatial and temporal axes.
One embodiment contemplates a spatial neighborhood of 1 pixel, a temporal neighborhood of 3 pixels around p, and a global smoothing parameter h=1.

After computing the 3D-LSKs/features from the query (sitting action) and training video, a principal component analysis can be performed to reduce feature dimensionality. To achieve computation efficiency, dimensions of the feature vector can be reduced to, for example, 4. A similarity between the query and training video can be determined using matrix cosine similarity, which detects the presence/absence of the sitting action in the test video or a classifier such as the support vector machine.

Figure 9A:
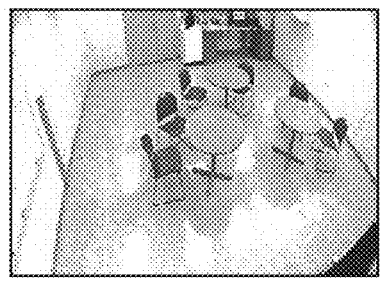
FIG. 9A is an example image frame from a side-view camera

Returning to FIG. 7, an online process is shown for identifying a sitting behavior using the processor. The image buffering module 116 acquires video capturing the scene of interest at S706. In the contemplated embodiment, this video is acquired from a camera 105 positioned to capture the scene from an oblique angle. Furthermore, the camera 105 can be stationary where the scene includes a closed space, such as a room, or the seats aren't expected to move. The desired angle enables a clear viewing of a person's movement from a standing-to-sitting position at the seat. For instance, the act of sitting (i.e., "sitting behavior")—including a noticeable change in a person's height and shape—can be observed from a side-viewing angle. This change is not as noticeable from an overhead viewing angle. In the contemplated embodiment, this camera 105 can be positioned to capture a side angle view of the chairs generally parallel to the floor (see FIG. 9); however, an overhead view at an oblique angle is also contemplated. Furthermore, the module 116 can acquire video from a camera 105 positioned to capture the scene from an overhead view, as discussed supra in the teaching accompanying FIG. 2.

At S708, in a given frame acquired from the side-view video data, the object detection module 118 defines a region of interest (ROI) around a seat(s) where sitting behavior can be expected. Mainly, any known object-detection method can be used to localize and/or define the ROI, such as the deformable part model approaches taught in "Object Detection with Discriminatively Trained Part Based Models", the color-based approach taught in "Learning Color Names for Real-World Applications"; the texture-based approach taught in "Dynamic texture recognition using local binary patterns with an application to facial expressions", all mentioned supra. Other example approaches include seat detection, segmentation, and/or manual annotation in an empty space.

Figure 9B:
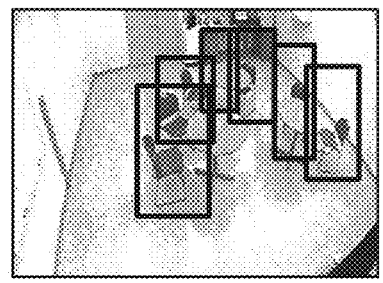
FIG. 9B shows localized ROIs, represented as bounding boxes, around the seats detected in the frame of FIG. 9A.

In the contemplated embodiment, the ROI is localized in a given reference frame including an empty space—i.e., where all surveyed seats are unoccupied and there are no people in the room and/or around the seats. In embodiments where the tables and chair layouts are fixed, such as a classroom or airplane setting, etc., a manual annotation of the seats can be received. FIG. 9B shows localized ROIs, represented as bounding boxes, around the seats detected in the frame of FIG. 9A.

Returning to FIG. 7, each ROI of a given frame in the sequence is analyzed to search for sitting behavior in the ROI, i.e., around a seat(s). In other words, once the system generates the reference activity feature vectors, stored in the classifier 124, the sitting behavior detection module 126 searches for the sitting behavior in other frame sequences in time. Mainly, the module 126 acquires the spatial-temporal data from the buffering module 116 or the object detection module 118, extracts vectors corresponding to a seat in a given frame at S710, and applies the vectors to the classifier 124. At S712, the module 126 receives a score output by the pre-trained classifier 124 corresponding with each ROI. The scores are calculated for each ROI over the video in a temporal sliding window manner with step size of one frame or a predefined number of frames depending on the camera frame rate. The scores for the multiple frames of the sequence are mapped onto a score map or graph, which indicates a confidence level that a particular sitting behavior is being detected or observed in the frames. FIG. 10A shows three example score maps per frame, where each map corresponds with one of the seats detected in the corresponding example frame. FIG. 10B shows the score map later in time after a subsequent frame in the sequence is analyzed. However, the example frames of FIGS. 10A-B are only two in the series. Each score map plots the frame number (i.e., time) against the score associated with that frame. The higher the score at a specific frame for a ROI, the more likely it is that a sitting behavior in being observed in that region at that frame. The example frame of FIG. 10A shows people moving around the monitored space. The example frame of FIG. 10B alternately shows the people sitting on the three detected seats later in the video sequence. However, the people sat in their respective chairs at different times in a video sequence. Therefore, a score map represents variations in the score of the classifier at different times (frames). The circle 10 on each plot in FIGS. 10A-B points to the global maximum/highest score, which corresponds with the point in time that the features in the ROI most likely match those of a sitting behavior stored in the classifier. As viewable in FIG. 10B, these maximum are at different frames/points in time for each seat in the space, meaning the people seating in the respective chairs sat at different points in time.

Figure 11A:
FIGS. 11A-C show example frames, which were captured from the ceiling mounted camera and identified as part of the processing performed on in FIG. 2.
Figure 11B:
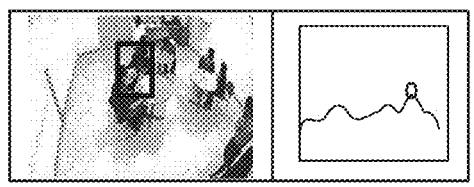
Figure 11C:
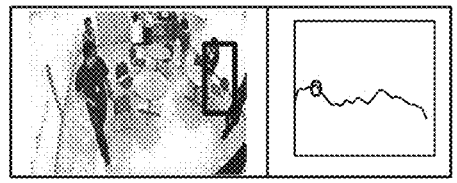

Returning to FIG. 7, the module 126 determines the frame associated with the maximum (highest confidence score) and selects that frame as a candidate frame for including sitting action at S714. More specifically, because the global maximum indicates the frame number that (or time when) the classifier recognizes, for a given seat, as having the closest association with sitting behavior, the module 126 selects that frame (or a frame corresponding to the time) as a potential candidate for including sitting behavior at the ROI. FIGS. 11A-C show the actual frames corresponding to the global maximum of each plot of FIG. 10. As viewable in FIGS. 11A and 11B, the global maximum in the corresponding plot identifies the frame where sitting behavior is detected in the ROI.

In embodiments using a camera(s) at one viewing angle, the foregoing method 700 can be used to detect the sitting behavior. However, the classifier approach assumes that there are no occlusions in the camera's view, and that only one person is performing the action of approaching a seat and sitting down. However, in many environments, the real activity occurs within a complex background including multiple people simultaneously performing different actions. In a busy indoor environment, the classifier output may not be as robust as in a generally empty environment. Embodiments are contemplated where the maximum score may not accurately represent a correct detection of sitting behavior due to, for example, training error, lack of strong local features, illumination change, occlusion and noise in the video signal. For example, the frame identified by the global maximum of the plot shown in FIG. 11C does not correctly detect sitting behavior. In certain embodiments, the system associates the frame number corresponding to the maximum score as showing characteristics of potential sitting behavior, and treats the frame as candidate—only—for further processing. Therefore, in order to increase the robustness of the overall method 700, the system can perform further processing to verify that the sitting behavior detected in the image frame actually results in the seat being occupied. To do this, contemplated embodiments also consider and/or use the seat occupancy information from the ceiling mounted camera and corresponding analysis performed in method 200.

In other words, embodiments are contemplated where the detected sitting behavior results at S714 are the final results, and the recognized sitting behavior is treated as meaning the seat is occupied. Similarly, embodiments are contemplated where the occupancy results at S214 are treated as final results. However, in one embodiment the system can determine the final sitting behavior and/or occupancy at each seat by determining if the candidate frame selected at S712 matches the seat occupancy status results, for that same frame, at S214 (FIG. 2). In other words, the system can compare the output at S214 and S714 to select a final frame corresponding to when the seat is first occupied.

Returning to FIG. 7, the frame comparison module 128 acquires the frame number corresponding to when the seat-of-interest first became occupied at S214. At S716, the module 128 determines if this frame number matches the candidate frame number for sitting behavior detected in the corresponding ROI (from S714). If the frame numbers match or the difference between frame numbers fall within a predetermined range, the status of the candidate frame is updated to be the final frame number.

FIG. 11A-C show example frames acquired at S214, which were captured from the ceiling mounted camera 104 and were identified as part of the processing performed on the corresponding video sequence. Each example frame corresponds to a respective ROI localized in the example frames shown in FIGS. 11A-C, which were captured from the side mounted camera and were identified as part of the processing performed on the corresponding video sequence.

Figure 12A:
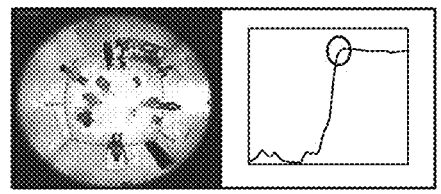
FIGS. 12A-C show score maps corresponding to the frames output by ceiling camera video data.
Figure 12B:
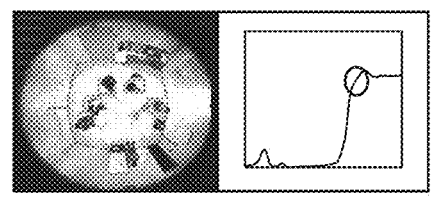
Figure 12C:
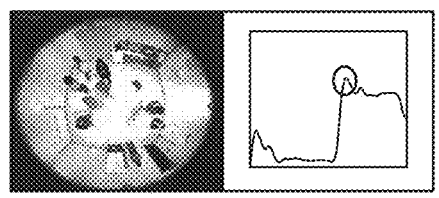

The score corresponding to the frame number output by the ceiling camera video data is circled in the score maps (FIGS. 12A-C), which were plotted for the sequences. As viewable in FIGS. 12A and 12B, the score corresponding to the frame identified at S214 (or acquired at S714) is not very far from the global maximum. The difference between the identified frames numbers is small and falls within a predetermined range of, for example, 10 frames. Therefore, the candidate frame determined at S714 (corresponding to the global maxima) is selected as the final frame number associated with the sitting behavior and occupancy. However, as viewable in FIG. 12C, the score corresponding to the frame identified at S214 (or acquired at S714) is not close to the global maximum. The difference (by several hundred frame numbers) between frame numbers corresponding to this new location and the previous location (i.e. global maximum) is greater than the predetermined threshold.

Figure 12D:
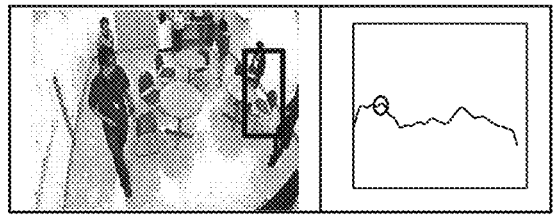
FIGS. 12D-E show the false and true sitting behavior for the same person being observed in two frames by the side-mounted camera.
Figure 12E:
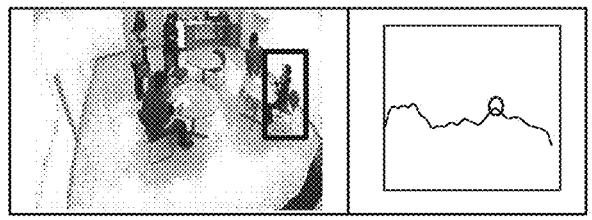

In response to the difference between frame numbers not falling within the range, the module 128 measures the score for the frame number generated by the operation in method 200. Next, the module 128 computes the difference between this score and the global maxima corresponding to the frames identified in each of the operations of FIGS. 2 and 7. The module 128 compares the scores' difference between a predetermined threshold. In response to the scores' difference falling below the threshold, the system selects the frame output at S214 as the final frame. FIGS. 12D-E show the candidate frame and the new frame selected as the final frame. As viewable in FIGS. 12D-E show the false and true sitting behavior for the same person being observed in two frames by the side-mounted camera 104, but the frame number corresponding to the true occupancy in FIG. 12E can be identified using the ceiling-mounted camera 104. The method ends at S216.

The fusion of information from the method of S200 and 700 improves the robustness of the sitting behavior detection. Furthermore, because the method 200 can be performed on the video data acquired from the ceiling mounted camera 104 in real-time, there is no extra computational cost incurred for offline training. Therefore, the final frame number associated with the occupancy status can consider information from both the ceiling-mounted video data and the side-mounted video-data at minimal cost.

The methods 200, 700 are performed to determine variable types of output and information, such as the percentage of seats occupied in a defined space, which ones of multiple seats are occupied in the space, whether a seat-of-interest is occupied, at which frame in the sequence did a seat(s) first become occupied, and the like. The desired occupancy information can be used in further processing of the video data to determine the settle-down time.

Figure 13:
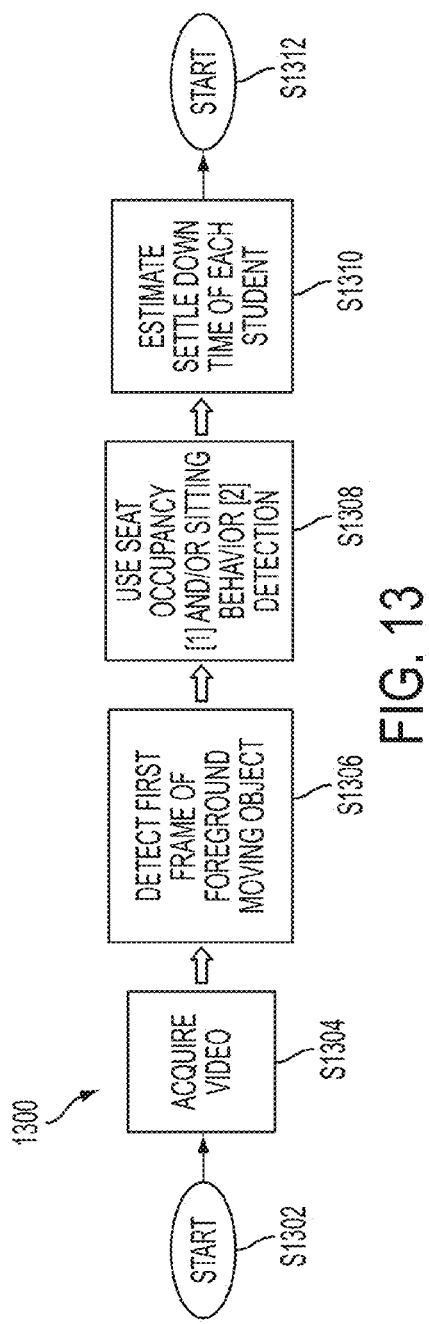
FIG. 13 shows a method for determining settle-down time.

Continuing with FIG. 13, a method 1300 for determining settle-down time is shown. While the output of this method 1300 can be determined for any number of spaces including cinemas, meeting rooms, airplanes, trains, waiting rooms, and hospitals, etc., the system and method are disclosed herein for a classroom setting. This classroom setting is discussed for illustrative purposes only, and there is no limit to the scene-of-interest for which the present methods 200, 700, 1300 can be applied. The method starts at S1302.

At S1304, the image buffering module 116 acquires video data from at least one of the cameras 104, 105. The camera or number of viewing angles—of the selected video data—can depend on the specific application and/or user preferences. First, the module 130 determines a start time for computing the duration it takes for a person(s) to settle into a seat. In the illustrative example, the module 130 can calculate the time it takes for students to settle-down for learning to begin. The start time can correspond to any of a number of different activities, such as, for example, the time a bell rings, a known time when class starts, the time when a monitor/teacher asks the student(s) to find their seats, the time that one or more students enter the room, etc. When the start time corresponds to a known time, the module 130 can determine the frame number captured at that time. If the start time is a variable time that depends on the teacher, the system can process the video data to search for a predetermined gesture behavior, such as waving a hand toward the camera or holding a sign or object to the camera's view. In response to recognizing the gesture behavior, the module can identify the corresponding frame number capturing the gesture.

In a classroom environment, the settle down time can correspond to the time it takes students to seat after they enter the classroom environment. Therefore, in the illustrative embodiment, the start time corresponds to the frame that captures when a first person/student enters the space/classroom. The module 130 processes the acquired video data to determine the frame when the first student enters. The system can apply any known method to identify the frame. In the contemplated embodiment, the module 130 can search for a moving object in the foreground of a given frame, and associate a detected foreground object as being a person/student that entered the space at S1306. Because the classroom space is generally empty before students enter it, foreground background detection is one example approach to obtain the initial time when students enter the class. This disclosure is not limited to any approach used to measure foreground. In the contemplated embodiment, a two frame differencing operation can be performed to search for a foreground object.

Figure 14A:
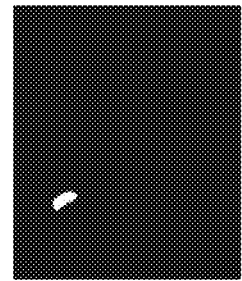
FIGS. 14A and 15A show example image frames where a person is captured entering the room at a door.
Figure 14B:
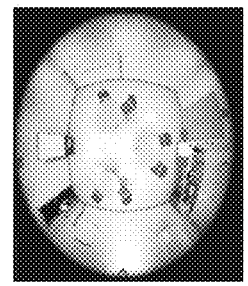
FIGS. 14B and 15B show a detected object.
Figure 15A:
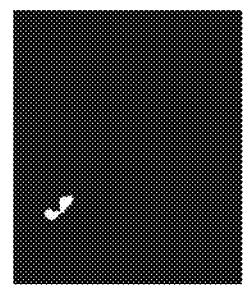
Figure 15B:
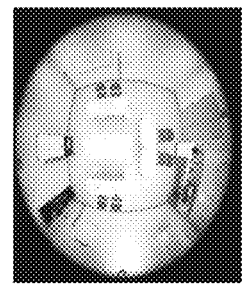

More specifically, the module 130 can measure the difference between every new frame of video and the initial frame. FIGS. 14A and 15A show example image frames where a person is captured entering the room at a door. FIGS. 14B and 15B show a detected object. Then, the module 130 can compare the size of the detected object to a predetermined threshold. In response to the size meeting and/or exceeding the threshold, the module 130 can associate the object as belonging to a student/person. In one example, the threshold can be 1200 pixels for an object captured by a camera with 640*480 resolution.

The module 130 identifies the number of the frame where the moving object is detected, and associates this frame number with a start time. Next, the module 130 acquires from modules 122 or 126 the final frame number corresponding to when a student occupies a seat-of-interest at S1308. Using the start and final frame numbers, the module 130 estimates the settle-down time at S1310. Mainly, the system can calculate the difference between the start and final frames, and use the difference and the known frequency of the camera to compute the settle-down time.

Once the settle down time of each person or student is determined, the outputs can be aggregated to an overall time for the entire space or classroom. The method ends at S1312.

The method of determining settle-down time is applicable to a wide variety of applications. It can be used to estimate the settle-down time in a number of venues including, but not limited to, cinemas, hospitals, classrooms, conferences, stadiums, and transportation vehicles such as planes, trains, and ferries, etc. The seat occupancy information also determined in the present disclosure has a wide variety of applications. In one illustrative example, the occupancy information can be automatically determined in a school classroom setting and relayed to the attendance office without requiring the teacher lose valuable instruction time on taking attendance. The sitting behavior information can be used to observe a student's attention level and/or attitude. For example, frequent changes in activity or feature vectors can suggest excessive movement by the student, where the seat is assigned to a student. This same information is useful in transportation vehicles, where the system can alert a captain/driver of a person's excessive movement when that person's or neighboring persons' safety is affected by the movement. For example, in an airplane, excessive movement by a passenger may be dangerous in inclement weather, and the system can alert the flight crew of the passenger's movement away from the seat.

In a classroom environment, a known settle-down time can prompt a teacher to manage a class differently. One aspect of the disclosure is that the information output by the system can enable users to become more efficient in operations requiring persons be seated before starting the operations, particularly by managing the operation to a lot for an estimated settle-down time, etc. Settle down time can also be tracked over multiple days or multiple classes to gain an understanding of how it varies as the class evolves over longer periods of time, such as over a school semester, or how it varies from class to class or teacher to teacher.

Although the methods are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting sitting behavior, the method comprising:
    acquiring a sequence of frames capturing a scene-of-interest at an overhead view;
    detecting at least one empty seat within the scene-of-interest and associating the seat as being unoccupied and the frame as a reference frame;
    extracting reference features describing a region of the unoccupied seat in the reference frame and quantifying the reference features to form a reference feature vector;
    extracting features describing the region in a given frame and quantifying the features to form a current feature vector;
    measuring a change in a feature vector over time using the reference feature vector and the current feature vector; and,
    determining a status of the seat in the given frame as being one of occupied and unoccupied based on the change in the feature vector.

2. The method of claim 1, wherein the extracting the reference features and features includes measuring color attributes and the quantifying the reference features and the features includes computing a color histogram describing the region and generating a feature vector using the histogram.

3. The method of claim 1, wherein the measuring the change includes:
    determining a trajectory of deviation reflecting the feature vector over time;
    in response to the trajectory meeting and exceeding an adaptive threshold, associating a frame substantially at a point in the sequence of frames where the trajectory met and exceeded the adaptive threshold as a candidate frame where sitting behavior is observed.

4. The method of claim 1, wherein the measuring the change in the feature vector includes computing a KL divergence between the reference and given frames using the reference feature vector and current feature vector.

5. The method of claim 1 further comprising:
    determining a trajectory of deviation reflecting the feature vector over time;
    computing a first derivative of the trajectory over time;
    determining a second derivative of the trajectory over time; and,
    in response to the second derivative being substantially at a global minimum, associating the given frame as a first candidate frame where sitting behavior is observed.

6. The method of claim 1, further comprising:
    in response to the change in the feature vector not meeting a predetermined threshold, associating a status of the seat in the given frame as being unoccupied; and,
    in response to the change in the feature vector meeting or exceeding the predetermined threshold, associating the status of the seat in the given frame as being occupied.

7. The method of claim 6 further comprising:
    acquiring a second sequence of frames capturing the scene-of-interest from a field of view different from that in the first sequence of frames;
    determining a region of interest ("ROI") where sitting behavior is expected within the scene;
    extracting activity features from the ROI in each frame of the second sequence and generating an activity feature vector using the activity features;
    applying the activity feature vector of the each frame to a previously trained classifier to obtain a score for the each frame;
    mapping scores for the second sequence onto a score map;
    identifying a maximum score on the score map;
    associating a second candidate frame corresponding to the global maximum as showing characteristics of potential sitting behavior.

8. The method of claim 7 further comprising:
    determining a difference between the first and second candidate frames;
    in response to the difference falling within a predetermined range, updating a status of the seat in the given frame as being occupied.

9. The method of claim 1, wherein the detecting the at least one unoccupied seat is performed by an object detection method selected from a group consisting:
    deformable part model approach;
    color-based approach;
    texture-based approach;
    seat detection;
    segmentation;
    manual orientation; and
    a combination of the above.

10. A system for detecting sitting behavior, the system comprising a sitting detection determination unit including a memory and a processor in communication with the processor configured to:
    acquire a sequence of frames capturing a scene-of-interest at an overhead view;
    detect at least one empty seat within the scene-of-interest and associating the seat as being unoccupied and the frame as a reference frame;
    extract reference features describing a region of the unoccupied seat in the reference frame and quantifying the reference features to form a reference feature vector;
    extract features describing the region in a given frame and quantifying the features to form a current feature vector;

measure a change in a feature vector over time using the reference feature vector and the current feature vector; and, determine a status of the seat in the given frame as being one of occupied and unoccupied based on the change in the feature vector.

11. The system of claim 10, wherein the processor is configured to extract the reference features and features by measuring color attributes, and the processor is configured to quantify the reference features and the features by computing a color histogram describing the region and generating a feature vector using the histogram.

12. The system of claim 10, where the processor is further configured to:

determine a trajectory of deviation reflecting the feature vector over time;

in response to the trajectory meeting and exceeding an adaptive threshold, associate a frame substantially at a point in the sequence of frames where the trajectory met and exceeded the adaptive threshold as a candidate frame where sitting behavior is observed.

13. The system of claim 10, where the processor is further configured to:

compute a KL divergence between the reference and given frames using the reference feature vector and current feature vector.

14. The system of claim 10, where the processor is further configured to:

determine a trajectory of deviation reflecting the feature vector over time;

compute a first derivative of the trajectory over time;

determine a second derivative of the trajectory over time; and, in response to the second derivative being substantially at a global minimum, associating the given frame as a first candidate frame where sitting behavior is observed.

15. The system of claim 10, where the processor is further configured to:

in response to the change in the feature vector not meeting a predetermined threshold, associate a status of the seat in the given frame as being unoccupied; and, in response to the change in the feature vector meeting or exceeding the predetermined threshold, associate the status of the seat in the given frame as being occupied.

16. The system of claim 15, where the processor is further configured to:

acquire a second sequence of frames capturing the scene-of-interest from a field of view different from that in the first sequence of frames;

determine a region of interest ("ROI") where sitting behavior is expected within the scene;

extract activity features from the ROI in each frame of the second sequence and generating an activity feature vector using the activity features;

apply the activity feature vector of the each frame to a previously trained classifier to obtain a score for the each frame;

map scores for the second sequence of frames onto a score map;

identify a maximum score on the score map;

associate a second candidate frame corresponding to the global maximum as showing characteristics of potential sitting behavior.

17. The system of claim 16, where the processor is further configured to:

determine a difference between the first and second candidate frames;

in response to the difference falling within a predetermined range, update a status of the seat in the given frame as being occupied.

18. The system of claim 10, wherein the detecting the at least one unoccupied seat is performed by an object detection method selected from a group consisting:

deformable part model approach;
color-based approach;
texture-based approach;
seat detection;
segmentation;
manual orientation; and
a combination of the above.

19. A method for detecting sitting behavior, the method comprising:

acquiring a sequence of frames capturing the scene-of-interest;

determining a region of interest ("ROI") where sitting behavior is expected within the scene-of-interest;

extracting activity features from the ROI in each frame of the sequence and generating an activity feature vector using the activity features;

applying the activity feature vector of the each frame to a previously trained classifier to obtain a score for the each frame;

mapping scores for the sequence onto a score map;

identifying a maximum score on the score map;

associating a candidate frame corresponding to a global maximum as showing characteristics of potential sitting behavior.

* * * * *